United States Patent [19]

Athanassiu et al.

[11] 4,390,036
[45] Jun. 28, 1983

[54] ROLLING DIAPHRAGM VACUUM CONTROL

[75] Inventors: Christos Athanassiu, Medford; Wilfred H. St. Laurent, Jr., Marblehead, both of Mass.

[73] Assignee: Bellofram Corporation, Burlington, Mass.

[21] Appl. No.: 251,470

[22] Filed: Apr. 6, 1981

[51] Int. Cl.³ .................. F16K 7/02; F16K 31/126
[52] U.S. Cl. ........................ 137/116.5; 137/625.38; 251/DIG. 2
[58] Field of Search ............ 251/DIG. 2; 137/625.38, 137/116.5

[56] References Cited

U.S. PATENT DOCUMENTS 2,720,218 10/1955 Otto .
2,720,378 10/1955 Otto .
3,070,108 12/1962 Fischer .
3,766,933 10/1973 Nicholson, Jr. .
4,092,998 6/1978 Taplin .

*Primary Examiner*—Arnold Rosenthal
*Attorney, Agent, or Firm*—Theresa F. Camoriano; Vance A. Smith

[57] ABSTRACT

A vacuum controller for maintaining a defined vacuum pressure to a remote location, including a housing which defines a cavity. The controller includes means for connecting the cavity to the remote location, to a high vacuum, and to a control signal pressure. There is a cup-shaped plunger, having an opening in its side wall, which is adapted to reciprocate in the cavity, and there is a flexible diaphragm which seals between the housing and the plunger. The diaphragm also operates as a valving mechanism, such that, when the plunger moves in one direction, the diaphragm closes off the opening in the side wall of the plunger, and when the plunger moves in the other direction, it opens the opening.

15 Claims, 6 Drawing Figures

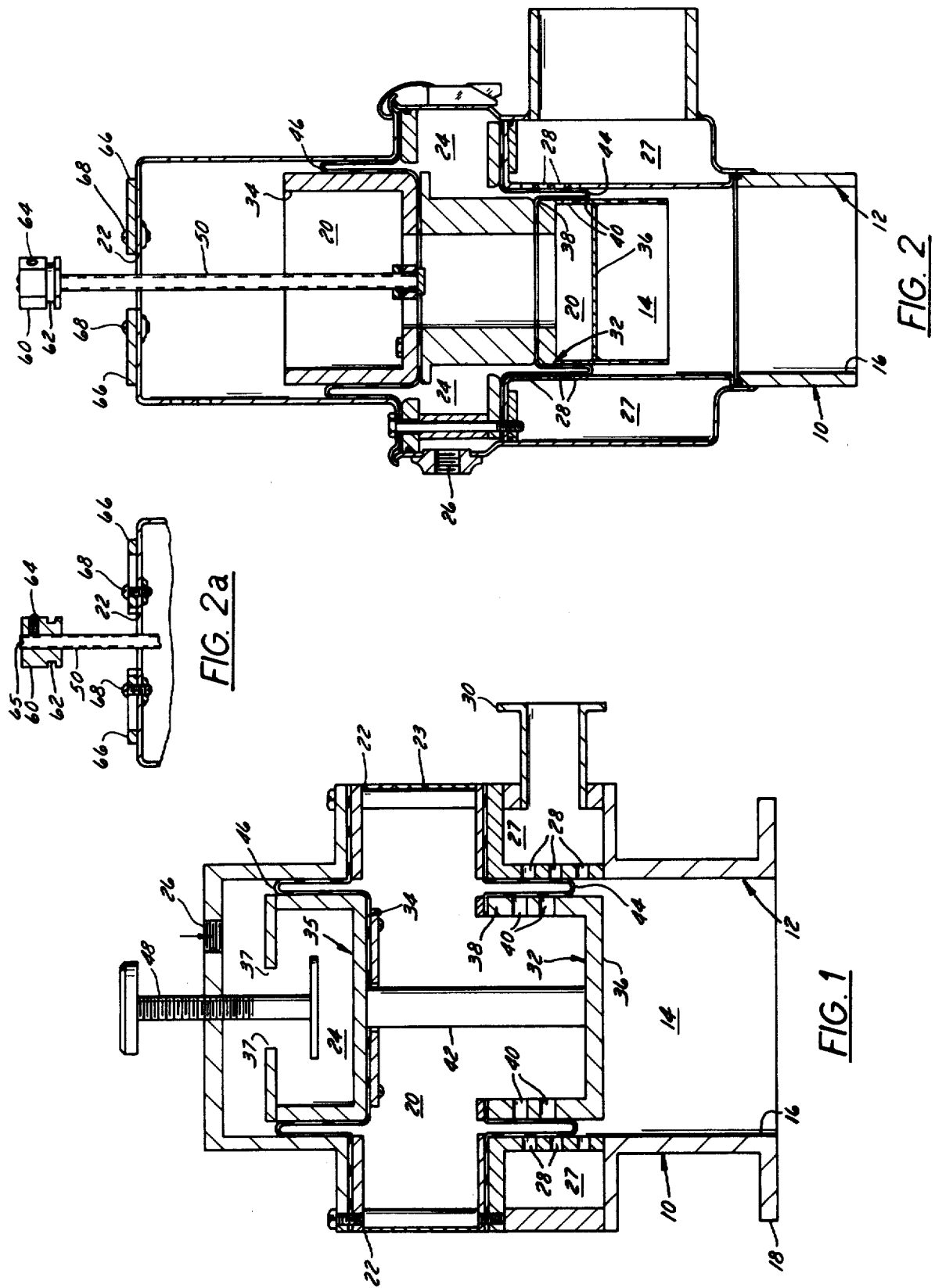

ROLLING DIAPHRAGM VACUUM CONTROL

BACKGROUND OF THE INVENTION

There are several types of vacuum controllers which have been used with paper making machines. Most of these controllers provide some kind of valving which connects a part of the paper making machines, such as a flat box, either to a high vacuum or to atmosphere, in order to control the vacuum supply to the paper making machine.

U.S. Pat. No. 3,766,933, issued Oct. 23, 1973, which is hereby incorporated by reference, describes a vacuum controller of the prior art. The aforementioned patent will hereafter be referred to as the Nicholson patent. The Nicholson patent shows a housing having several ports through its inner wall. There are plungers inside the housing, with a flexible diaphragm sealing between each plunger and the inner wall of the housing. In the Nicholson patent, a diaphragm performs no more than one valving function, opening or closing only one set of ports in the housing and the only way fluid can move from one chamber to another is by flowing through a port in the inner wall of the housing. This results in a complicated apparatus having several chambers. It also requires that there be a separate flexible diaphragm and plunger for each valving function to be performed. The plungers move back and forth, opening and closing ports in response to pressure changes in the chambers surrounding the plungers.

In this art, it is desirable to make the controllers as sensitive as possible to pressure changes. Any resistance to movement of the plungers reduces the sensitivity of the controller and therefore should be eliminated if possible. The Nicholson controller has a plurality of flexible diaphragms which are used for sealing and valving, and each diaphragm offers a certain resistance to movement resulting in a reduction in sensitivity of the controller.

A main object of the present invention is to provide a more sensitive controller than those available in the prior art. Another object is to simplify the design of the housing for the controller so as to reduce the cost of manufacture. Another object is to provide a design which permits a single diaphragm to serve more than one valving function, thereby reducing the number of valving-type diaphragms, which reduces the amount of resistance offered by the diaphragms. These and other objects will be obvious to one skilled in the art upon reading the description of the preferred embodiments.

SUMMARY OF THE INVENTION

A vacuum controller for maintaining a defined vacuum pressure to a remote location, including a housing which defines a cavity. The controller includes means for connecting the cavity to the remote location, to a high vacuum, and to a control signal pressure. There is a cup-shaped plunger, having an opening in its side wall, which is adapted to reciprocate in the cavity, and there is a flexible diaphragm which seals between the housing and the plunger. The diaphragm also operates as a valving mechanism, such that, when the plunger moves in one direction, the diaphragm closes off the opening in the side wall of the plunger, and when the plunger moves in the other direction, it opens the opening.

BRIEF DESCRIPTION OF THE DRAWINGS

FIG. 1 is a cross-sectional view of one embodiment of the present invention.

FIG. 2 is a cross-sectional view of a second embodiment of the present invention.

FIG. 2a is an enlarged cross-sectional view of a broken-away portion of FIG. 2 showing the manual override system.

DESCRIPTION OF THE PREFERRED EMBODIMENTS

Figure 5:
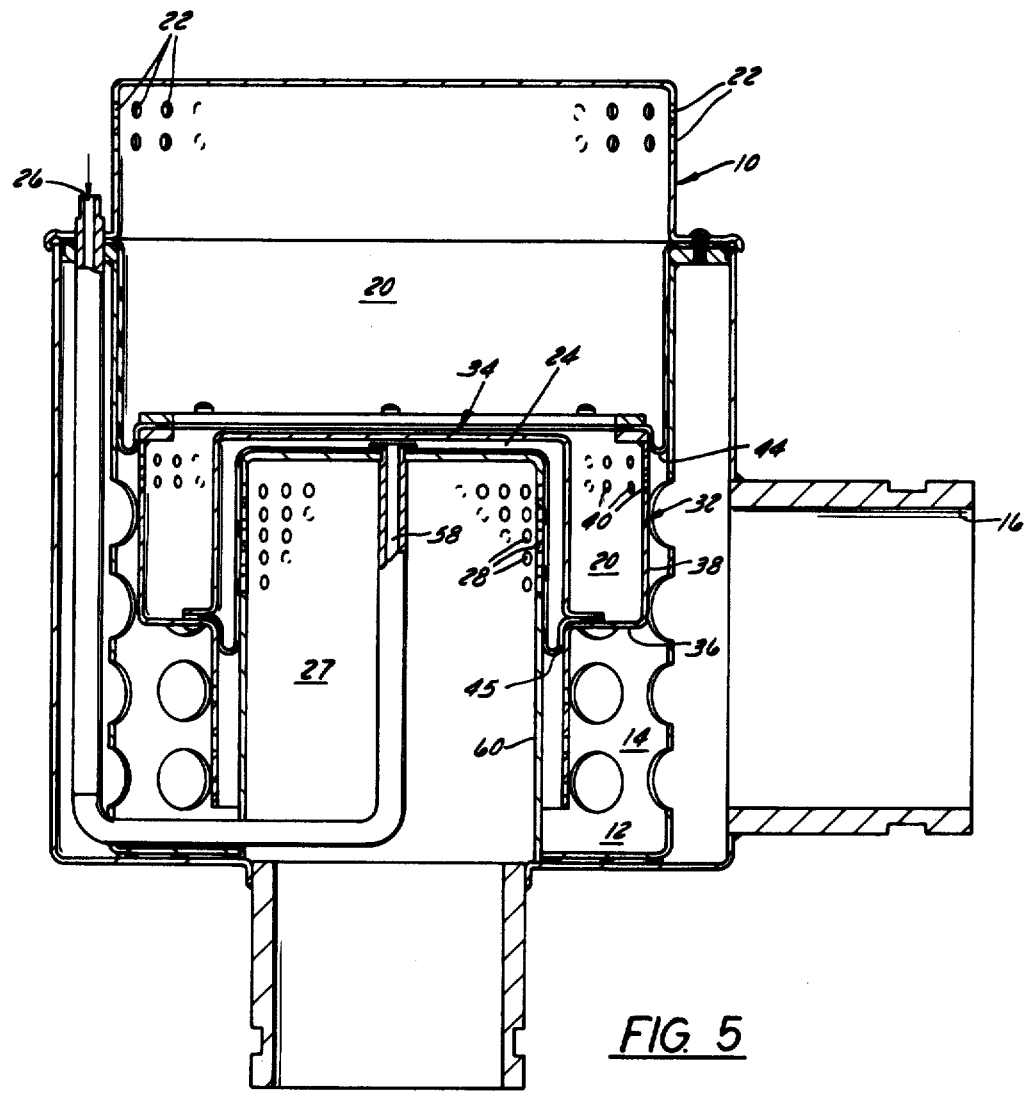
FIG. 5 is a cross-sectional view of still another embodiment of the present invention.

FIG. 1 illustrates one embodiment of the invention in which there is a generally cylindrical housing 10 which defines a cavity 12. Cavity 12 is divided into four chambers. Chamber 14 is in constant fluid communication with a remote location, which is the location at which the vacuum is to be regulated. Chamber 14 communicates with the remote location through port 16 by means of a pipe or some sort of conduit (not shown) attached to flange 18. Chamber 20 is in constant fluid communication with atmosphere through port 22. Screen 23 covers port 22 in order to reduce the incidence of debris entering chamber 20. Chamber 24 is in constant fluid communication with a control signal pressure through screw connector 26. For this embodiment, the control signal pressure would be a vacuum, at a pressure less than atmospheric pressure. Chamber 27 is in constant fluid communication with a high vacuum. Ports 28 provide a means for communication between the high vacuum and chamber 14. A conduit from the high vacuum is attached to flange 30. The high vacuum would generally be provided by a vacuum pump (not shown).

There are two plungers 32, 34 in cavity 12. Plunger 32 is cup-shaped and has a bottom wall 36 and a side wall 38 with openings 40 in side wall 38. Rigid member 42 extends between plungers 32 and 34 and is attached at one end to plunger 34 and at the other end to plunger 32. Flexible diaphragm 44 is clamped into housing 10 and to plunger 32 and provides a seal between plunger 32 and housing 10 so as to separate chambers 14 and 20 in cavity 12. Diaphragm 46 is clamped into housing 10 and to plunger 34 and provides a seal between plunger 34 and housing 10 so as to separate chambers 24 and 20 in cavity 12. Diaphragms 44 and 46 are both flexible so they can roll as plungers 32, 34 reciprocate in cavity 12, but diaphragm 44 is made of a heavier material than diaphragm 46, because diaphragm 44 also serves a valving function, which will be explained later, while diaphragm 46 is made of a lighter material as it serves only as a seal. The difference in materials in diaphragms 44, 46 is such that diaphragm 46 offers less resistance to movement than does diaphragm 44. Stop 48 is attached to housing 10 and prevents plunger 34 from moving too far toward either end of housing 10. Stop 48 also provides a manual override to move plungers 32, 34 up or down by pushing on the bottom 35 or pulling on the top 37 of plunger 34.

The operation of the controller shown in FIG. 1 is as follows:

The movement of plungers 32, 34 is controlled by forces provided by the pressures in chambers 14, 20, 24 acting on plungers 32, 34. The pressure in chamber 20 is always fixed at atmospheric pressure, and the pressure in chamber 24 is always fixed at a predetermined vacuum. Therefore, the change of pressure which causes plungers 32, 34 to reciprocate inside cavity 12 is the change of pressure in chamber 14, which is the pressure of the remote location to be controlled. The control signal pressure in chamber 24 is fixed so that, when the remote location is at the proper pressure, plungers 32, 34 will be balanced so that diaphragm 44 will be sealed against housing 10 and against side wall 38 so as to close off ports 28 and openings 40 in side wall 38.

When the pressure at the remote location becomes too high, the pressure in chamber 14 acting on bottom wall 36 of plunger 32 increases, causing plungers 32, 34 to move toward chamber 24. This movement of plungers 32, 34 causes diaphragm 46 to unroll and causes diaphragm 44 to roll up, closing openings 40 and opening ports 28 for fluid communication between chamber 27 and chamber 14. This communication with the high vacuum will cause the pressure at the remote location to decrease, which in turn decreases the pressure in chamber 14 and causes plungers 32, 34 to move back down toward a balanced position.

When the pressure at the remote location is too low, the pressure in chamber 14 acting on bottom wall 36 will also be low, causing plungers 32, 34 to move toward chamber 14. This movement of plungers 32, 34 causes diaphragm 46 to roll up and causes diaphragm 44 to unroll, closing fluid communication through ports 28 and opening fluid communication through openings 40, so that atmosphere passes from chamber 20 through openings 40 into chamber 14, thereby increasing the pressure at the remote location.

FIG. 2 shows another embodiment of the present invention. This embodiment is similar to the embodiment shown in FIG. 1 with only a few differences. The first difference is that chamber 24, which is in constant fluid communication with the control signal pressure, is in a different location. Chamber 24 is now located so that it is separated from chamber 20 by diaphragm 46 and from chamber 14 by diaphragm 44. Another difference is that, in order for this controller to operate properly, the control signal pressure in chamber 24 must be at a pressure higher than atmospheric pressure. Another difference is that plunger 34 does not have a closed bottom wall, so chamber 20 extends down into the inside of plunger 32. Diaphragm 46 is clamped to housing 10 and to plunger 34. Diaphragm 44 is clamped to housing 10 and to plunger 32. The embodiment of FIG. 2 includes a manual override system, including center rod 50 attached to plunger 32. A hex fitting 60, having a groove 62 in its outer surface and a set screw 64 threaded through its radius, is threaded over center rod 50, and hex fitting 60 is locked onto center rod 50 by tightening set screw 64. Locks 66 are screwed into housing 10 by screws 68. In order to operate the manual override system shown in more detail in FIG. 2a, set screw 64 is loosened to unlock hex 60, and hex 60 is turned until groove 62 lines up with locks 66. Locks 66 are inserted into groove 62 and are fixed in that position by tightening screws 68. To achieve the desired position of plungers 32, 34, center rod 50 is held fixed by placing the end of a screw driver in slot 65 of center rod 50, and hex 60 is turned in the appropriate direction, either clockwise or counterclockwise, to move plungers 32, 34 as desired. The manual override system also provides a visual indicator of the location of the plungers.

The operation of the embodiment shown in FIG. 2 is controlled by the pressures in chambers 14, 20 and 24. The pressure in chamber 20 is constantly atmospheric pressure, and the pressure in chamber 24 is a constant, predetermined control signal pressure somewhat higher than atmospheric pressure. Thus, the only pressure that changes is the pressure in chamber 14, which is the pressure of the remote location to be controlled.

When the pressure in chamber 14 is the desired pressure, the forces on plunger 32 from chambers 14, 20 and 24 are balanced. However, if the pressure in chamber 14 is too low, the resultant force on plunger 32 causes plungers 32, 34 to move toward chamber 14 which causes diaphragm 46 to roll up and causes diaphragm 44 to unroll, closing fluid communication through ports 28 and opening fluid communication through openings 40 in side wall 38 of plunger 32, which permits fluid at atmospheric pressure to flow from chamber 20 through openings 40 into chamber 14 and to the remote location (not shown), thereby increasing the pressure at the remote location.

When the pressure in chamber 14 is too high, the resultant force on plungers 32, 34 causes them to move toward chamber 20 which causes diaphragm 46 to unroll and causes diaphragm 44 to roll up, closing fluid communication through openings 40 and opening fluid communication between chambers 27 and 14 through ports 28, which permits fluid from chamber 14 to flow out through ports 28 to the high vacuum, thereby reducing the pressure in chamber 14 and at the remote location.

Figure 3:
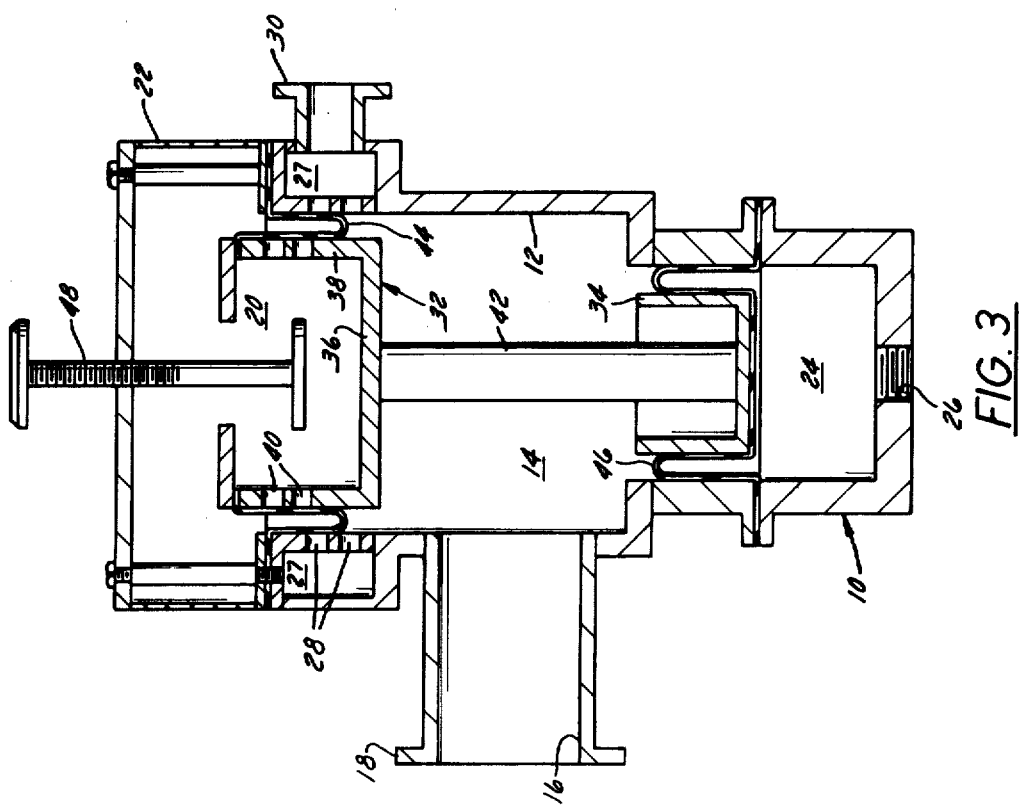
FIG. 3 is a cross-sectional view of another embodiment of the present invention.

FIG. 3 shows another embodiment of the present invention, which is similar to the embodiment in FIG. 1. The only differences are that the chambers are rearranged so that chamber 14 is between chambers 20 and 24 and that the control pressure signal in chamber 24 is at a pressure higher than atmospheric pressure. Again, the pressures in chambers 20 and 24 are constant, and the only pressure that changes is the pressure in chamber 14. A reduction of pressure in chamber 14 below the desired pressure causes plungers 32, 34 to move toward chamber 24, opening fluid communication through openings 40, and an increase in the pressure in chamber 14 above the desired pressure causes plungers 32, 34 to move toward chamber 20, opening fluid communication through openings 28.

Figure 4:
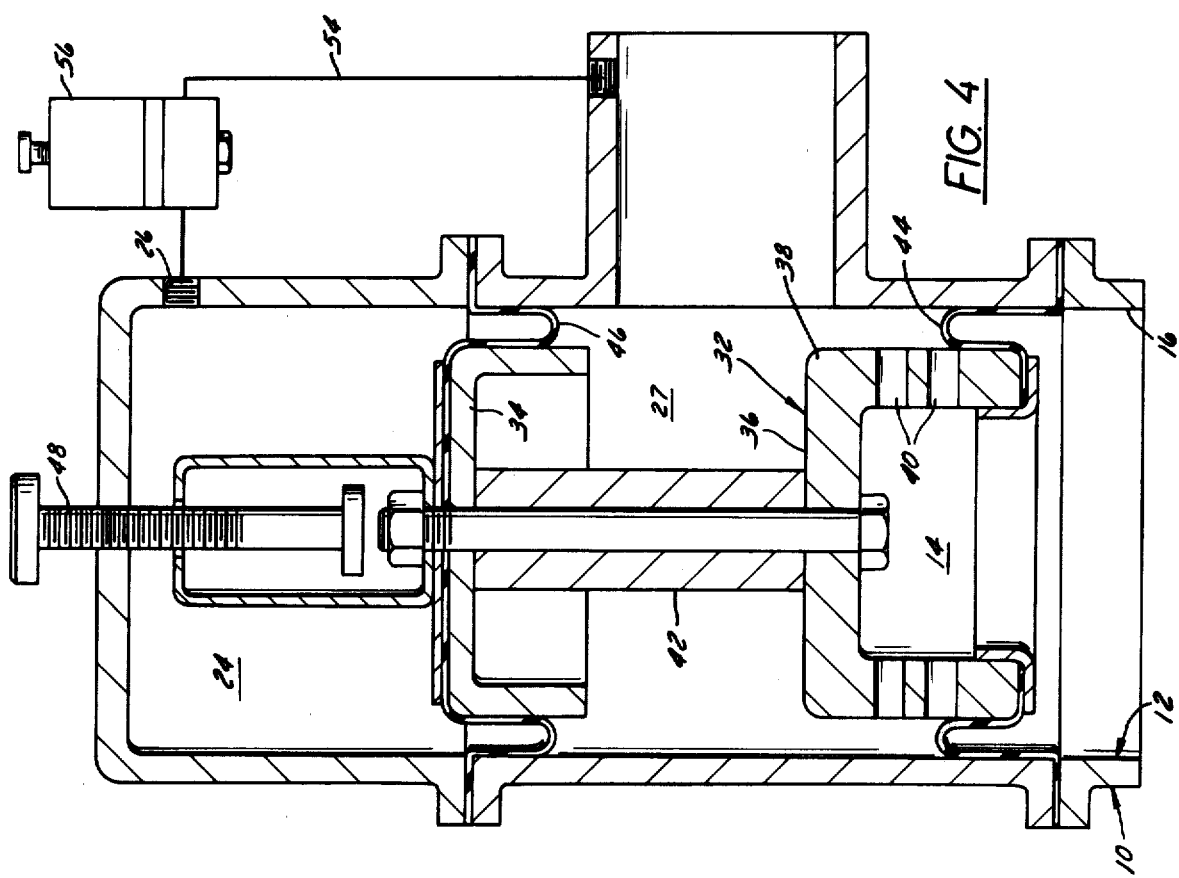
FIG. 4 is a cross-sectional view of yet another embodiment of the present invention.

FIG. 4 shows another embodiment which is different from the embodiment in FIG. 1 because there is no fluid communication between cavity 12 and atmosphere. Instead of the four chambers 14, 20, 24, 27 in FIG. 1, the embodiment of FIG. 4 has three chambers 14, 24, 27. Chamber 14 is in constant fluid communication with the remote location (not shown), chamber 24 is in constant fluid communication with the control signal pressure, and chamber 27 is in constant fluid communication with the high vacuum. The pressure in chamber 24 is a constant control pressure signal provided by conduit 54 which communicates with the high vacuum and by vacuum regulator 56 in line with conduit 54. The pressure in chamber 27 is constantly in communication with the high vacuum provided by a vacuum pump (not shown). Variations in the pressure in chamber 27 do not cause movement of plungers 32, 34 because the surface areas of plungers 32 and 34 acted on by the pressure in chamber 27 are equal. Thus, the pressure in chamber 27 always pushes up on plunger 34 with the same force that it pushes down on plunger 32, resulting in no net force tending to move plungers 32, 34. The variation of pressure which causes movement of plungers 32, 34 is the variation of pressure in chamber 14 which is the pressure of the remote location to be controlled. When the pressure in chamber 14 is higher than the desired pressure, the force on plungers 32, 34 from pressures in chambers 24, 27 and 14 causes plungers 32, 34 to move toward chamber 24, opening fluid communication through openings 40 so that fluid in chamber 14 may flow out into chamber 27, thereby reducing the pressure in chamber 14 and at the remote location. When the pressure in chamber 14 is lower than the desired pressure, the force on plungers 32, 34 causes them to move toward chamber 14 so that diaphragm 44 closes fluid communication through openings 40, preventing further evacuation of the fluid in chamber 14 into chamber 27.

FIG. 5 illustrates another embodiment of the invention. In this embodiment, housing 10 defines a cavity 12 which is divided into chambers. Chamber 14 is in constant fluid communication with a remote location (not shown) the pressure of which is to be regulated. Chamber 20 is in constant fluid communication with atmosphere through ports 22. Chamber 24 is in constant fluid communication with the control signal pressure through conduit 58. Chamber 27 is in constant fluid communication with a high vacuum.

There is a plunger 32 in cavity 12 adapted to reciprocate inside cavity 12. Plunger 32 is cup-shaped and has a bottom wall 36 and a side wall 38 with openings 40 in side wall 38. Plunger 34 is rigidly attached to plunger 32 at its bottom wall 36. Diaphragm 44 is attached to plunger 32 and to housing 10. Diaphragm 44 also separates chamber 20 from chamber 14 and serves as a valving means to open and close fluid communication between chamber 20 and chamber 14 through openings 40. Diaphragm 45 is attached to plunger 34 and to inner member 60 fixed to housing 10, and separates chamber 24 from chamber 14. Diaphragm 45 also serves as a valving means to open and close fluid communication through ports 28 in housing 10.

The movement of plungers 32 and 34 is controlled by the pressures in chambers 24, 14 and 20, surrounding plungers 32 and 34. Since the pressure in chamber 20 is always atmospheric pressure and the pressure in chamber 24 is always a predetermined control signal pressure, the only pressure that changes is the pressure in chamber 14 which is the pressure of the remote location to be controlled. When the pressure in chamber 14 is lower than the desired pressure, the resultant force on plungers 32, 34 causes them to move away from chamber 20, causing diaphragm 44 to unroll so as to open fluid communication through openings 40, which permits atmosphere to flow into chamber 14 and to the remote location. The movement away from chamber 20 also causes diaphragm 45 to unroll, sealing off fluid communication through ports 28 in inner member 60. When the pressure in chamber 14 is higher than the desired pressure, the resultant force on plungers 32, 34 causes them to move toward chamber 20, whereby diaphragm 44 rolls up and seals against side wall 38 of plunger 32, closing fluid communication through openings 40, and diaphragm 45 rolls up, opening fluid communication between chamber 27 and chamber 14 through ports 28, which permits fluid to flow from the remote location to the high vacuum.

While these figures have shown several specific embodiments of the present invention, various other features, shown in U.S. Pat. No. 4,092,998, which is hereby incorporated by reference, may be utilized in this invention. For example, a spring may be used, a slanting wall may be used in the housing and/or the side wall of the plunger, and an isolation chamber may be used for stabilizing the operation of the invention or damping when there are variations in pressure. Other modifications and variations of the above-described embodiments of the invention will also be obvious to those skilled in the art. Accordingly, within the scope of the appended claims, the invention may be practiced otherwise than as specifically described.

What is claimed is:

1. A pressure controller for maintaining a defined vacuum pressure to a remote location, comprising:
 a. a housing defining a cavity;
 b. means for connecting said cavity to said remote location;
 c. means for connecting said cavity to a high vacuum;
 d. means for connecting said cavity to a control signal pressure;
 e. a first plunger, comprising a side wall and a bottom wall, said first plunger defining an opening through its side wall and being adapted to reciprocate inside said cavity;
 f. means for sealing between said first plunger and said housing so as to define first and second chambers in said cavity;
 g. first valving means for opening and closing fluid communication between said first and second chambers through said opening in said first plunger; and
 h. second valving means for opening and closing fluid communication between said second chamber and said high vacuum, said sealing means and first and second valving means comprising a flexible diaphragm attached to said housing and to said first plunger such that movement of said first plunger toward said first chamber causes said diaphragm to seal against said side wall of said first plunger, thereby closing fluid communication through said opening in said plunger while opening fluid communication between said second chamber and said high vacuum, and movement of said first plunger toward said second chamber opens fluid communication through said plunger opening and closes fluid communication between said second chamber and said high vacuum by sealing against said housing.

2. The pressure controller recited in claim 1 further comprising a third chamber in said cavity, said third chamber being sealed off from fluid communication with said first and second chambers in said cavity, wherein said means permitting connection to the control signal pressure is in fluid communication with said third chamber.

3. The pressure controller recited in claim 2 further comprising means permitting connection of said cavity to atmosphere.

4. The pressure controller recited in claim 3 wherein said means permitting connection to said remote location is in fluid communication with said second chamber and said means permitting connection to atmosphere is in fluid communication with said first chamber.

5. The pressure controller recited in claim 4 further comprising:

a second plunger adapted to reciprocate inside said cavity;

a means for rigidly connecting said first and second plungers;

a seal between said second plunger and said housing, sealing off said third chamber, such that said first and second plungers move together and such that movement of said first and second plungers is controlled by pressures in said first, second and third chambers acting on said first and second plungers.

6. The pressure controller recited in claim 2, further comprising:

a second plunger adapted to reciprocate inside said cavity;

a rigid member extending between and connecting said first and second plungers;

a seal between said second plunger and said housing, sealing off said third chamber, such that said first and econd plungers move together and such that movement of said first and second plungers is controlled by pressures in said first, second and third chambers acting on said first and second plungers.

7. The pressure controller recited in claim 6, wherein said means for connecting to said remote location is in constant fluid communication with said first chamber.

8. A pressure controller for maintaining a defined vacuum pressure to a remote location, comprising:
 a. a housing defining a cavity;
 b. first and second plungers adapted to reciprocate in said housing, said plungers being attached to each other such that they move together, said first plunger including a side wall defining a port;
 c. first and second flexible diaphragms, acting to seal between said first plunger and said housing and between said second plunger and said housing, respectively;
 d. said housing, plungers and diaphragms defining first, second, third and fourth chambers in said cavity;
 d. wherein said housing defines:
  i. a port into said first chamber for constant fluid communication with atmosphere;
  ii. a port into said second chamber for constant fluid communication with said remote location;
  iii. a port into said third chamber for constant fluid communication with a control signal pressure;
  iv. a port into said fourth chamber for constant fluid communication with a high vacuum;
  v. a port between said second and fourth chambers to permit fluid communication between them; and
 g. valving means provided by said diaphragms for opening and closing fluid communication between said first and second chambers through the port in said plunger and between said second and fourth chambers through the port between them;
 h. such that, if the pressure at said remote location is too low, the fluid pressures in said chambers will cause said plungers to move so that fluid communication is opened between said first and second chambers and is closed between said second and fourth chambers; and such that, if the pressure at said remote location is too high, the fluid pressures in said chambers will cause said plungers to move to close fluid communication between said first and second chambers and to open fluid communication between said second and fourth chambers.

9. A pressure controller as recited in claim 8, wherein said first flexible diaphragm is the valving means between said first and second chambers and between said second and fourth chambers.

10. A pressure controller as recited in claim 8, wherein said valving means for opening and closing fluid communication between said first and second chambers comprises said first flexible diaphragm, and said valving means for opening and closing fluid communication between said second and fourth chambers comprises said second flexible diaphragm.

11. A pressure controller, comprising:
 a. a housing defining a cavity and defining at least two ports for permitting fluid communication between said cavity and fluids at various pressures;
 b. a plunger, comprising a side wall and a bottom wall, said plunger defining an opening through its side wall and being adapted to reciprocate inside said cavity;
 c. means for sealing between said plunger and said housing so as to define first and second chambers in said cavity; said housing and sealing means also defining a third chamber;
 d. first valving means for opening and closing fluid communication between said first and second chambers through said opening in said plunger; and
 e. second valving means for opening and closing fluid communication between said second chamber and said third chamber;
wherein said sealing means and said first and second valving means comprise a flexible diaphragm attached to said housing and to said plunger such that movement of said plunger in one direction causes said diaphragm to seal against said side wall of said plunger, closing fluid communication through said opening in said plunger and opening fluid communication between said second and third chambers, and movement of said plunger in the other direction causes said diaphragm to seal off fluid communication between said second and third chambers and to open fluid communication through said opening in said plunger.

12. A pressure controller as recited in claim 1, 8, or 11, further comprising a stop attached to said housing, said stop being located so as to contact one of said plungers at both extremes of its travel to prevent said plungers from moving too far toward either end of said housing and being movable so as to provide a manual override for moving said plungers to the desired position.

13. A pressure controller as recited in claim 1, 8, or 11, further comprising a manual override system including a lock attached to said housing and a rod attached to said plungers, wherein said lock and said rod are adapted to cooperate with each other to fix the location of said plungers, said rod also providing a visual indicator of the location of said plungers.

14. A pressure controller for maintaining a defined vacuum pressure to a remote location, comprising:
 a. a housing defining a cavity;
 b. first and second plungers inside said cavity, said plungers being connected to each other so that they reciprocate together, said first plunger comprising a side wall and a bottom wall and defining an opening through its side wall;
 c. means for sealing between said plungers and said housing so as to define first, second and third chambers in said cavity, said first chamber adapted for fluid communication with said remote location; said second chamber adapted for fluid communication with a high vacuum; and said third chamber adapted for fluid communication with a control pressure;

d. valving means for opening and closing fluid communication between said first and second chambers through said opening in said plunger; wherein said valving means and said means for sealing between said first plunger and said housing comprise a flexible diaphragm attached to said housing and to said first plunger;

e. a conduit from said second chamber to said third chamber and a vacuum regulator (56) in line with said conduit, such that said control pressure is provided by said conduit, and further comprising a stop attached to said housing, said stop being located so as to contact one of said plungers at both extremes of its travel to prevent said plungers from moving too far toward either end of said housing and being movable so as to provide a manual override for moving said plungers to the desired position.

15. A pressure controller for maintaining a defined vacuum pressure to a remote location, comprising:

a. a housing defining a cavity;

b. first and second plungers inside said cavity, said plungers being connected to each other so that they reciprocate together, said first plunger comprising a side wall and a bottom wall and defining an opening through its side wall;

c. means for sealing between said plungers and said housing so as to define first, second and third chambers in said cavity, said first chamber adapted for fluid communication with said remote location; said second chamber adapted for fluid communication with a high vacuum; and said third chamber adapted for fluid communication with a control pressure;

d. valving means for opening and closing fluid communication between said first and second chambers through said opening in said plunger; wherein said valving means and said means for sealing between said first plunger and said housing comprise a flexible diaphragm attached to said housing and to said first plunger;

e. a conduit from said second chamber to said third chamber and a vacuum regulator (56) in line with said conduit, such that said control pressure is provided by said conduit, and further comprising a manual override system including a lock attached to said housing and a rod attached to said plungers, wherein said lock and said rod are adapted to cooperate with each other to fix the location of said plungers, said rod also providing a visual indicator of the location of said plungers.

* * * * *